United States Patent [19]
Chauvet

[11] 4,314,609
[45] Feb. 9, 1982

[54] APPARATUS FOR THE PREPARATION OF THE SOIL

[76] Inventor: Robert Chauvet, Saint-Saphorin Sur Morges, Vaud, Switzerland

[21] Appl. No.: 127,449

[22] Filed: Mar. 5, 1980

[30] Foreign Application Priority Data

Mar. 6, 1979 [CH] Switzerland ............ 2148/79

[51] Int. Cl.³ .................................. A01B 19/06
[52] U.S. Cl. .................................. 172/54.5
[58] Field of Search .............. 172/102, 101, 53, 54, 172/96, 54.5

[56] References Cited
FOREIGN PATENT DOCUMENTS

| 38919 | 4/1887 | Fed. Rep. of Germany | 172/102 |
| 6614446 | 5/1967 | Netherlands | 172/102 |
| 6602555 | 8/1967 | Netherlands | 172/101 |
| 6805709 | 10/1969 | Netherlands | 172/54.5 |
| 1074385 | 7/1967 | United Kingdom | 172/102 |

Primary Examiner—Paul E. Shapiro
Attorney, Agent, or Firm—Emory L. Groff, Jr.

[57] ABSTRACT

This invention relates to an apparatus which can be connected to a tractor for preparation of the soil. The apparatus has at least two rows of toothed bars mounted on a frame, each row consisting of spaced apart pairs of bars, all of which are drawn behind the tractor at a right angle thereto. Sets of rods are attached to each of the toothed bars at one end and at their other ends the rods are attached to a related eccentric member. The eccentric members are rigid with a drive shaft journaled in the frame and having a free end connected to the power take-off means of the tractor. Upon rotation of the drive shaft, the toothed bars are displaced at different intervals laterally of the path of travel of the tractor to till the soil.

3 Claims, 3 Drawing Figures

APPARATUS FOR THE PREPARATION OF THE SOIL

The present invention has for its object an apparatus for preparation of the soil which is adapted to be coupled to an agricultural tractor, comprising a frame, at least two rows of two sets of toothed bars mounted on the frame and disposed in side by side relationship and at a right angle to the path of travel of the tractor, the toothed bars being actuated by means of rods and eccentrics connected to the power supply of the tractor.

The apparatus is characterized in that the eccentrics actuating the toothed bars of one row are displaced relative to one another in such a manner as to move the toothed bars in an opposite direction relative to one another and in that the eccentrics of the next adjacent row of toothed bars are displaced relative to the eccentrics actuating the preceding row in a manner such that the toothed bars of the latter make substantially a half stroke when the toothed rods of the adjacent row are at the end of their movement towards the outside or the inside, the bars relative one to the other of each of the rows of toothed bars being displaced therefore for part of their travel in the same direction and in the other part of their travel in an opposite direction.

The invention will now be described further, by way of example, with reference to the attached drawing, in which.

Figure 1:
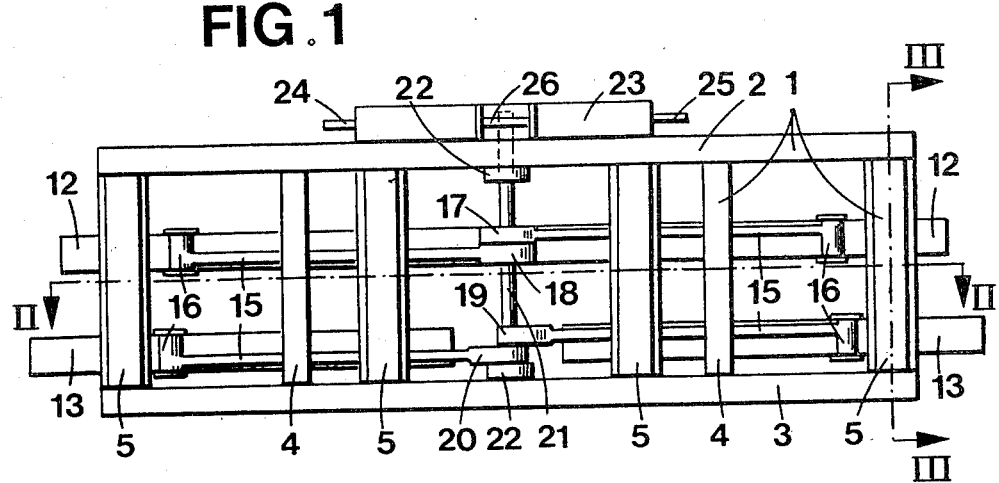
FIG. 1 is a top plan view.
Figure 2:
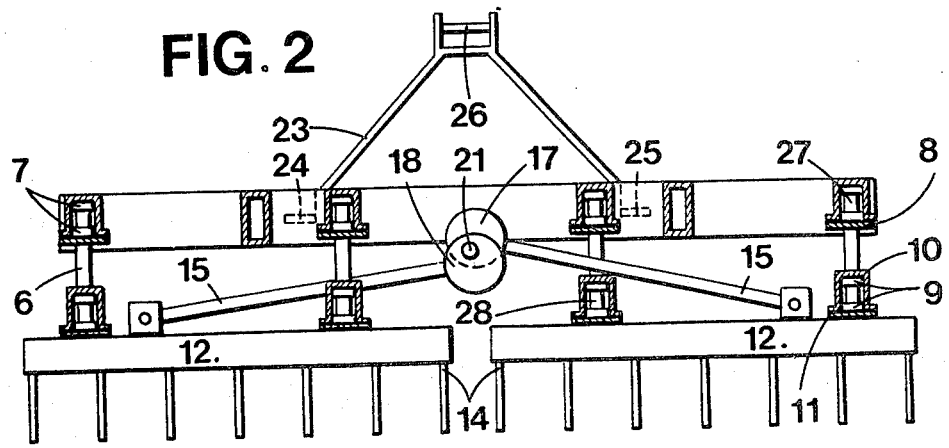
FIG. 2 is a longitudinal section along the line II—II of FIG. 1.
Figure 3:
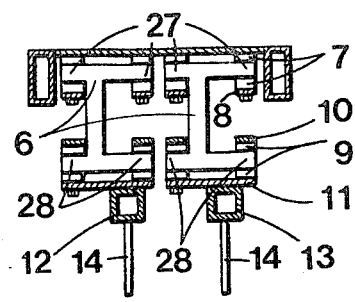
FIG. 3 is a view, partly in section, taken on the line III—III of FIG. 1.

The apparatus shown comprises a frame 1 including four metal tubes 2, 3 and 4 of rectangular cross-section and four hollow sheet metal beams 5 which are connected to the tubes by soldering. In each beam 5 two oscillating levers 6 are mounted whose square upper bearings 27 are disposed between two resilient bands 7, the lower one of which rests on plates 8 which are bolted to the beams 5.

The square bearings 28 at the lower end of the oscillating levers 6 are disposed between resilient bands 9 on supports 10 bolted to plates 11 integral with bars 12 and 13, each of which carries a row of teeth 14 intended to penetrate the soil.

Four rods 15 connected to the bars 12 and 13 by pillow blocks 16 communicate to said bars an alternating movement due to the action of the four eccentrics 17, 18, 19 and 20 fixed on a shaft 21 which can be connected by a shaft to universal joints, (not shown) to the power take-off means at the rear of the tractor. The shaft 21 is mounted in two bearings 22, 23 fixed to the frame 1. The eccentrics 17 and 18 are fixed on the shaft 21 in a manner so that the front toothed bars 12 oscillate with an alternating movement and always in a direction opposite one another. The same is true of the eccentrics 19 and 20 and for the rear toothed bars 13 except with a displacement of 90° on the shaft 21 with respect to the eccentrics 17, 18 so that the rear bars are each still at their outermost position of a stroke whenever the front bars are half-way through one of their strokes.

The frame 1 carries a support 23 provided with an assembly of three axles intended to be connected to the coupling of the tractor at three points.

I claim:

1. Apparatus for preparation of the soil adapted to be attached to an agricultural tractor, comprising a frame, at least two rows of toothed bars (12,13) mounted on the frame in side by side relationship and at a right angle to the path of travel of said tractor, means for actuating said bars at one end, an eccentric (17,20) at the other end of said rods, a drive shaft (21) on which said eccentrics are fixed, said drive shaft adapted to be connected to the power take-off means of said tractor, characterized in that said eccentrics (17,18) which actuate one row of said bars (12) are displaced in a direction opposite to one another, said eccentrics (19,20) which actuate an adjacent row of said bars (13) are displaced in a manner relative to said eccentrics (17,18) actuating said first mentioned row of bars whereby said adjacent row of bars (13) are substantially at half-stroke while the first mentioned row of bars (12) is at the end of its stroke toward the outside or toward the inside of the path of travel, said bars (12,13) opposite one another in each of said rows of bars being displaced therefore during a portion of its travel in the same direction and during the other portion of its travel in an opposite direction, said toothed bars (12,13) each provided with movable supports (6), bearings (27,28) for each support, said bearing being of quadrangular transverse cross-section and mounted on resilient bands (7,9).

2. Apparatus according to claim 1 wherein, each said bearing (27,28) is oriented so that two of its opposite lateral faces are subjected to radial force during operation.

3. Apparatus according to claim 2 wherein, the lateral faces of said bearings (27,28) are kept in place by said bands of resilient material (7,9) between oppositely disposed supporting members (5,8,10,11).

* * * * *